(12) United States Patent
Costa et al.

(10) Patent No.: US 8,097,555 B2
(45) Date of Patent: Jan. 17, 2012

(54) PROCESS FOR THE PRODUCTION OF HYBRID CATALYSTS FOR FISCHER-TROPSCH SYNTHESIS AND HYBRID CATALYST PRODUCED ACCORDING TO SAID PROCESS

(75) Inventors: Alexandre de Figueiredo Costa, Rio de Janeiro (BR); Agustin Martines Feliu, Alzira (ES); Joan Rollán Martinez, Xirivella (ES); Henrique Soares Cerqueira, Rio de Janeiro (BR); Joberto Ferreira Dias Junior, Rio de Janeiro (BR); Eduardo Falabella Sousa Aguiar, Rio de Janeiro (BR)

(73) Assignee: Petroleo Brasileiro S.A. - Petrobras, Rio De Janeiro (BR)

( * ) Notice: Subject to any disclaimer, the term of this patent is extended or adjusted under 35 U.S.C. 154(b) by 175 days.

(21) Appl. No.: 12/260,123

(22) Filed: Oct. 29, 2008

(65) Prior Publication Data

US 2009/0124712 A1 May 14, 2009

(30) Foreign Application Priority Data

Oct. 29, 2007 (BR) .................................... 0705939

(51) Int. Cl.
*B01J 23/00* (2006.01)
*B01J 21/00* (2006.01)
*B01J 20/00* (2006.01)

(52) U.S. Cl. .............. 502/327; 502/66; 502/74; 502/87; 502/242; 502/260; 502/261; 502/262; 502/308; 502/314; 502/349; 502/350; 502/355; 502/406; 502/407; 502/415; 502/439

(58) Field of Classification Search .................... 502/66, 502/74, 87, 242, 260, 261, 262, 308, 314, 502/327, 349, 350, 355, 406, 407, 439
See application file for complete search history.

(56) References Cited

U.S. PATENT DOCUMENTS

| | | | | |
|---|---|---|---|---|
| 4,154,751 A * | 5/1979 | McVicker et al. | ............. | 518/717 |
| 4,192,777 A * | 3/1980 | McVicker et al. | ............. | 502/184 |
| 4,304,871 A * | 12/1981 | Brennan et al. | ............. | 518/717 |
| 4,385,193 A * | 5/1983 | Bijwaard et al. | ............. | 585/310 |
| 4,396,539 A * | 8/1983 | Sapienza et al. | ............. | 502/326 |
| 4,463,101 A * | 7/1984 | Dwyer et al. | .................... | 502/74 |
| 4,471,145 A * | 9/1984 | Chu et al. | ........................ | 585/322 |
| 4,522,939 A | 6/1985 | Minderhoud et al. | | |
| 4,523,047 A * | 6/1985 | Chester et al. | ................. | 585/322 |
| 4,556,645 A * | 12/1985 | Coughlin et al. | ............... | 502/66 |
| 4,568,663 A * | 2/1986 | Mauldin | .......................... | 502/325 |
| 4,579,985 A | 4/1986 | Minderhoud et al. | | |
| 4,594,468 A | 6/1986 | Minderhoud et al. | | |
| 4,605,680 A * | 8/1986 | Beuther et al. | ................. | 518/715 |
| 4,617,283 A * | 10/1986 | Coughlin | ......................... | 502/66 |
| 4,622,308 A * | 11/1986 | Koikeda et al. | ................. | 502/66 |
| 4,624,967 A * | 11/1986 | Fiato et al. | ....................... | 518/700 |
| 4,652,538 A * | 3/1987 | Rabo et al. | ....................... | 502/66 |
| 4,740,487 A * | 4/1988 | Matheson et al. | ............... | 502/66 |
| 4,874,732 A * | 10/1989 | Miller et al. | ..................... | 502/74 |
| 4,874,733 A * | 10/1989 | Miller et al. | ..................... | 502/74 |
| 4,906,671 A | 3/1990 | Haag et al. | | |
| 5,187,138 A * | 2/1993 | Davis | ............................... | 502/255 |
| 5,306,860 A | 4/1994 | Bigeard et al. | | |
| 5,344,849 A | 9/1994 | Ayasse | | |
| 5,345,019 A | 9/1994 | Bigeard et al. | | |
| 5,780,381 A * | 7/1998 | Wilson et al. | ................... | 502/308 |
| 6,087,405 A | 7/2000 | Plecha et al. | | |
| 6,235,677 B1 * | 5/2001 | Manzer et al. | ................. | 502/232 |
| 6,353,035 B2 * | 3/2002 | Manzer et al. | ................. | 518/700 |
| 6,359,018 B1 * | 3/2002 | O'Rear et al. | ................. | 518/700 |
| 6,365,544 B2 * | 4/2002 | Herron et al. | ................... | 502/326 |
| 6,451,864 B1 * | 9/2002 | Wang et al. | ..................... | 518/715 |
| 6,555,725 B1 | 4/2003 | Wittenbrink et al. | | |
| 6,720,283 B2 * | 4/2004 | Ding et al. | ..................... | 502/184 |
| 6,730,708 B2 * | 5/2004 | Raje et al. | ....................... | 518/715 |
| 7,323,100 B2 * | 1/2008 | Espinoza et al. | ............ | 208/111.3 |
| 7,452,844 B2 * | 11/2008 | Hu et al. | ........................ | 502/327 |
| 7,462,338 B2 * | 12/2008 | Southward | ................. | 423/213.5 |
| 7,541,310 B2 * | 6/2009 | Espinoza et al. | ............... | 502/326 |
| 7,658,836 B2 * | 2/2010 | Euzen et al. | ..................... | 208/58 |
| 7,732,370 B2 * | 6/2010 | Casci et al. | ..................... | 502/329 |
| 7,732,500 B2 * | 6/2010 | Lok et al. | ....................... | 518/715 |
| 7,790,648 B2 * | 9/2010 | Dogterom et al. | ............. | 502/150 |
| 7,851,404 B2 * | 12/2010 | Lok | ................................ | 502/326 |
| 8,003,566 B2 * | 8/2011 | Casci et al. | ..................... | 502/328 |
| 2003/0139286 A1 | 7/2003 | Van Berge et al. | | |
| 2003/0144367 A1 | 7/2003 | Van Berge et al. | | |
| 2004/0087824 A1 | 5/2004 | O'Rear et al. | | |
| 2004/0092382 A1 | 5/2004 | John et al. | | |
| 2006/0100293 A1 | 5/2006 | Steenwinkel et al. | | |

FOREIGN PATENT DOCUMENTS

| | | |
|---|---|---|
| EP | 0 153 781 | 9/1985 |
| EP | 0 180 269 | 5/1986 |
| FR | 2 513 626 | 4/1983 |
| GB | 2 211 201 | 6/1989 |
| WO | WO 01/26810 | 4/2001 |

* cited by examiner

*Primary Examiner* — Cam N. Nguyen
(74) *Attorney, Agent, or Firm* — Nixon & Vanderhye P.C.

(57) ABSTRACT

Process for the production of hybrid catalysts formed by mixing two catalysts; one active in Fischer-Tropsch synthesis, the other being bifunctional. Such hybrid catalyst thus formed is active both in hydrocracking and in hydroisomerization reactions. The present invention in addition provides obtainment of a hybrid catalyst and application thereof conjointly with FT catalysts in Fischer-Tropsch synthesis reactions. The hybrid catalyst of the present invention is capable of producing in conditions typically such as those utilized in Fischer-Tropsch synthesis branched hydrocarbons in diverse bands relating to the products thereof (for example naphtha and diesel), reducing or even eliminating necessity for a subsequent hydrotreatment stage in such synthesis reactions. Utilization of such hybrid catalysts of the present invention prolongs the operational efficiency and working life of conventional Fischer-Tropsch synthesis catalysts, reducing substantially encapsulation of particles thereof by waxes produced in the hydroprocessing reactions.

8 Claims, No Drawings

PROCESS FOR THE PRODUCTION OF HYBRID CATALYSTS FOR FISCHER-TROPSCH SYNTHESIS AND HYBRID CATALYST PRODUCED ACCORDING TO SAID PROCESS

This application is based upon and incorporates by reference, the contents of Brazilian Patent Application No. PI 0705939-6 filed Oct. 29, 2007.

FIELD OF THE INVENTION

The present invention relates to a process for the production of hybrid catalysts for Fischer-Tropsch (FT) synthesis. More specifically the present invention relates to the production of an active and selective hybrid catalyst produced by means of the process of the present invention and its application in FT synthesis reactions for the production of branched hydrocarbons in both the naphtha band and in the diesel band.

BACKGROUND OF THE INVENTION

The increase in world energy demand linked to growing pressure for control of polluting emissions, responsible for global climatic changes, has brought about increased interest in the utilization of alternative sources for the production of fuels, particularly natural gas which promises to be the principal commercial energy resource of the $21^{st}$ century. World reserves of natural gas have increased in recent years and conversion of this energy source into synthesis gas, consisting of a mixture of $H_2$ and CO, creates many possibilities for production of a large number of fuels and chemical products.

This represents an excellent option for reducing dependence by the world economy on the preponderant use of crude oil. In addition to natural gas, synthesis gas may be produced by gasification of other materials such as heavy oils, biomass, coal, petroleum coke, etc.

In the Fischer-Tropsch synthesis, synthesis gas is converted into hydrocarbons, water and oxygenated products such as alcohols, aldehydes and ketones. Said synthesis gas may be produced by water vapor reformation of natural gas or by gasification of heavy hydrocarbon fractions, of coal or of biomass. For economic and environmental reasons natural gas has stood out as the principal source of raw material for Fischer-Tropsch synthesis.

Meanwhile an important problem occurring during synthesis reactions is loss of efficiency by the catalysts from the fact that the waxes produced in the stages of hydroprocessing reactions cause encapsulation of the particles of such catalysts and in this manner give, rise to deactivation thereof which, from a practical point of view, imposes the necessity of finding a solution to this problem affecting normal catalysts.

RELATED ART

Cobalt is probably the metal most studied by the various companies which have become interested in Fischer-Tropsch synthesis in recent years. In addition to methods of preparation, different supports and promoters have been proposed in the patent literature.

From among the principal promoter metals utilized in applications with cobalt the use of Ru, Re, Pd, Pt, Zr, Ti or Cr (but also Zn, Al, Mg, Cu or Ag) is described, as mentioned in U.S. Pat. Nos. 4,579,985 and 6,087,405 and United States patent application US 2003/0139286.

From among said metals Fe, Co, Ni and Ru are significantly active in Fischer-Tropsch synthesis in various commercial applications. Said metals have some properties in common, such as being active in hydrogenation reactions and being capable of forming carbonyls, the conditions utilized in Fischer-Tropsch synthesis being thermodynamically favorable for the formation of metal carbonyls which same play an important part in the mechanism of formation and of growth of hydrocarbon chains [H. SCHULZ, *Appl. Catal. A* 186 (1999) 3].

In the classic Gas-to-Liquids (GTL) process the products from the Fischer-Tropsch reactor are sent to a hydroprocessing stage wherein the final properties of the products (naphtha, diesel, paraffins and lubricants) are adjusted. The hydroprocessing processes most used are hydrotreatment, hydrocracking and hydroisodeparaffinisation. Employment of bifunctional catalysts containing acid and metal sites are common in said processes. Examples are described in U.S. Pat. Nos. 5,306,860, 5,345,019 and patent applications US 2004/0092382 A1 and US 2004/0087824 A1.

With regard to supports those principally employed in Fischer-Tropsch catalysts are silica, alumina and silica-alumina, and also titania and zeolites (WO 01/26810 A1, GB 2211201A, U.S. Pat. No. 4,906,671).

One manner of increasing activity of cobalt catalysts comprises modifying the method of the incorporation thereof (preparation with two impregnations with drying, calcination and partial reduction of the oxide of Co to CoO and final reduction to metallic Co) or utilizing supports coated with carbon (United States patent applications US 2003/0144367 and US 2003/0139286).

In patent EP 0180269 treatment of silica, silica-alumina or silica-magnesia supports is proposed with a compound based on silicone. Such treatment assists interaction of the support with the active metals.

Having the objective of maximizing medium distillates U.S. Pat. No. 4,522,939 and EP 0153781 propose a formula, a function of composition of the catalyst and of properties of the support to achieve this purpose.

Also with a view to maximizing medium distillates, particularly with a high ratio of linear paraffins to branched paraffins, U.S. Pat. No. 4,594,468 proposes a two-stage process. In a first stage the Fischer-Tropsch reaction is realized with a stream of synthesis gas rich in hydrogen ($H_2$/CO>2.0) in the presence of a Co catalyst promoted with Zr, Ti or Cr carried on a support of silica, alumina or silica-alumina. The products generated in such first stage and the remaining hydrogen are then consumed in a second hydrocracking stage in the presence of a metal catalyst.

Zeolitic supports have also been the subject of patents from various companies. An example thereof is application of zeolites ZSM-5 and Y to catalysts based on Co (WO 2001/26810).

Patent FR 2513626 proposes the employment of ferrierite promoted with alkaline or alkaline-earth metals or those from group VIB as support for Fischer-Tropsch catalysts. In one of the variants thereof the use of Cu is proposed as reduction promoter and K as selectivity promoter. The employment of ferrierite is presumed to favor formation of compounds in the band from 5 to 12 atoms of carbon.

Some patents have proposed the use of mixtures of catalysts. The mixing of two catalysts, one active in Fischer-Tropsch synthesis and the other applicable in the catalytic cracking process, is proposed in patent application US 2006/0100293.

U.S. Pat. No. 5,344,849 has already proposed the use of a physical mixture of three catalysts; one active in Fischer- Tropsch synthesis (Fe based), one active in the synthesis of methanol (Cu/ZnO), and another active in the conversion of methanol to petrol with the objective of increasing the yield of compounds in this band.

In U.S. Pat. No. 6,555,725 the use is proposed of a monolithic catalyst with a view to in situ conversion of paraffins produced in a Fischer-Tropsch process in a slurry bed.

However in the existing art it is known that one of the causes of deactivation of catalysts characteristic of Fischer-Tropsch synthesis is related to encapsulation of the particles thereof by waxes produced in the hydroprocessing reaction, demonstrating the necessity for finding catalytic systems providing solutions to this problem.

The invention herebelow disclosed utilizes the benefits of the discovery that the presence of a cocatalyst active in hydrocracking may assist in cracking part of said waxes, conferring greater stability on the Fischer-Tropsch catalyst.

SUMMARY OF THE INVENTION

The present invention discloses a process for the production of hybrid catalysts resulting from physically mixing a catalyst active in Fischer-Tropsch synthesis with another bifunctional catalyst active in hydrocracking and hydroisomerization reactions and the consequent utilization of a hybrid catalyst thus produced according to the present invention, with a view to the joint application thereof in conversion of mixtures of hydrogen and carbon monoxide into linear hydrocarbons and partial conversion of the latter into branched hydrocarbons.

Said hybrid catalyst is utilized in the production of branched hydrocarbons in the various bands relating to the products (for example naphtha and diesel) under conditions typically utilized in Fischer-Tropsch synthesis which same, whilst minimizing or even eliminating the problems associated with the transport of waxes in the reactor bed, reduces as a consequence the necessity for a subsequent hydroprocessing stage.

DETAILED DESCRIPTION OF THE INVENTION

The present invention relates to the application of a hybrid catalyst, active and selective, in conditions typically utilized in Fischer-Tropsch synthesis for production of branched hydrocarbons, both in the naphtha and in that of diesel.

In this manner the necessity for a subsequent hydroprocessing stage is reduced, minimizing or even eliminating problems associated with the transport of waxes.

It was unexpectedly discovered by the applicants that on employing a Fischer-Tropsch catalyst containing between 5% and 40% by weight of cobalt, preferentially between 10% and 30% by weight of cobalt, mixed with a bifunctional catalyst containing between 0.1% and 50% by weight of at least one metal from Group IVB and/or one metal from Group VIII, preferentially between 0.2% and 40% by weight of at least one metal from group IVB and/or one metal from Group VIII, the compounds obtained in the diesel band had a degree of branching many times greater than that of the base case.

The catalyst prepared according to the present invention contains, as active metal, cobalt; however, it could contain Fe or even contain or not contain metal promoters selected from the group preferentially comprising Ru, Re, Pd, Pt, Sr, Ti, Cr, Zn, Al, Mg, Mn, Cu and Ag.

The hybrid catalysts subject of the present invention, produced by means of mixtures of a Fischer-Tropsch catalyst with a bifunctional catalyst in mass proportions lying between 95:5 and 20:80 respectively, preferentially in mass proportions lying between 90:10 and 40:60 respectively, are useful in the process of conversion of synthesis gas having an $H_2/CO$ ratio in the band from 1.5 to 2.5, preferentially 1.8 to 2.2, operating at a temperature in the band from 150° C.-350° C., preferentially 200° C.-280° C., and pressure levels in the band from 15-40 bar (1500-4000 kPa), preferentially 18 to 30 bar, having the objective of producing petrol and medium distillates rich in paraffin compounds having a content of branched compounds in the band from 2% to 60% by weight, preferentially from 5% to 40% by weight, for molecules having a carbon chain structure containing a number of carbon atoms lying preferentially in the band from 5 to 22.

The process of production of such hybrid catalysts of the present invention comprises the following stages:

a) preparation of a Fischer-Tropsch catalyst based on Fe or Co carried on a support selected from the group consisting preferentially of silica, alumina, titania, niobia, zeolites or mesoporous silicoaluminates, selected from the group comprising preferentially MOR, FAU, BEA, ITQ-2, and ITQ-6;

b) preparation of a bifunctional catalyst containing at least one metal from Group IVB associated with or optionally replaced by one metal from Group VIII carried on a support selected from the group consisting of zeolites, mesoporous silicoaluminates, selected from the group comprising preferentially MOR, FAU, BEA, ITQ-2, and ITQ-6 or mixed acid oxides of the type $WO_x$—$ZrO_2$; and c) production of such hybrid catalyst by means of physically mixing the catalysts obtained in the foregoing stages.

PREFERRED EMBODIMENTS OF THE INVENTION

The preferred forms of realization for the production of the hybrid catalysts of the present invention are disclosed below and defined by means of representative examples of preparation of the catalyst according to the present invention, together with results of activity and selectivity obtained in an experimental bench unit.

The catalysts according to the invention herein disclosed may be commercially utilized in slurry bed, fluid bed or fixed bed reactors. Tests were realized in a fixed bed bench unit operating at P=20 bar, utilizing as reagent a mixture of $H_2$ and CO having an $H_2/CO$ molar ratio=2.

EXAMPLES

The representative examples disclosed hereinafter consider the preparation of hybrid catalysts for Fischer-Tropsch synthesis utilizing a mixture of two catalysts: one active in Fischer-Tropsch synthesis and another bifunctional, active in hydrocracking and hydroisomerisation, with a view to application thereof in the conversion of mixtures of hydrogen and carbon monoxide into linear hydrocarbons and conversion of said linear hydrocarbons into branched hydrocarbons.

Preparation of catalysts for obtainment of the hybrid catalyst of the present invention.

1 Preparation of Fischer-Tropsch Catalyst a) For preparation of the catalyst active in Fischer-Tropsch synthesis a commercial silica and an ITQ-6 delaminated zeolite were selected as supports. Such commercial silica employed was produced by Fluka (silica gel 100, pore volume=0.81 cm³/g). Said delaminated zeolite ITQ-6, U.S. Pat. No. 6,469,226, containing solely silicon and oxygen, was synthesized from zeolite laminar precursor FER (ferrite) containing solely silicon and oxygen (PREFER). Said laminar precursor was subsequently mixed with an aqueous solution of tetrapropylammonium hydroxide (TPAOH, 40% by weight) and cetyltrimethylammonium bromide (CTABr, 25% by weight), maintaining vigorous stirring at 80° C. for 16 h with a view to dilating the lamainas. The laminas were subsequently separated through introduction of such mixture into an ultrasound bath, proceeding to separation of the solids through acidification with a dilute solution of HCl until attaining a pH of 2.0, followed by centrifuging. The solid recovered was then calcined at 540° C.

b) 20% by weight of cobalt was introduced through dry impregnation with an aqueous solution of cobalt nitrate (98.9% purity) on SiO and ITQ-6 supports;

c) 1% by weight of Ru was introduced by dry impregnation into the catalyst Co/ITQ-6 as promoter, a solution containing 1.5% by weight of NITROSIL ($Ru^{3+}$ nitrate) manufactured by Aldrich being utilized as precursor;

d) the samples were oven-dried at 80° C. for 12 h;

e) calcination of the samples at 300° C. for 10 h with a heating rate of 1° C./min for preparation of the Fischer-Tropsch catalyst.

2 Preparation of Bifunctional Catalyst a) For production of the bifunctional catalyst the following commercial zeolites were selected as supports: CBV500 (zeolite of the FAU type, manufactured by Zeolyst International, total Si/Al ratio=2.6, network Si/Al ratio=4.7 and area=750 $m^2$/g); CP811 (zeolite of the BEA type, manufactured by Zeolyst International, total Si/Al ratio=12.5 and area=730 $m^2$/g); and a material of the $WO_x$—$ZrO_2$ type. This latter support may be prepared in various manners such as, for example, impregnation or coprecipitation. In the present example preparation by precipitation of zirconium oxyhydroxide was adopted through addition of ammonium, hydroxide (25% by weight, manufactured by Merck) to an aqueous solution of zirconyl chloride, $ZrOCl_2$ (Aldrich, 98%), until attaining a pH of 9.6. The solid obtained was filtered and washed exhaustively until total removal of chlorides and oven-dried at 160° C. for 12 h. The solid was subsequently impregnated with an aqueous solution of ammonium metatungstate $(NH_4)_6H_2W_{12}O_{40}$ (Fluka), with the quantity required for obtainment of a material having 12.7% by weight of W. Following evaporation of excess solvent in a rotavapor in vacuo the material was oven-dried at 80° C. and subsequently calcined under an air flow at 800° C. for 3 h;

b) as metallic component 1% platinum was introduced by dry impregnation of the various supports through an aqueous solution of hexachloroplatinic acid (Sigma).

c) following impregnation such bifunctional catalysts thus produced were oven-dried at 100° C. for 12 h and finally muffle-calcined at 500° C. for 3 h.

3 Production of Hybrid Catalysts

For the purposes of realization of trials the hybrid catalysts utilized in the present invention were produced by physical mixture in a proportion containing 50% by weight of Fischer-Tropsch catalyst and 50% by weight of bifunctional catalyst and, following crushing, subjected to milling and screening to obtain a particle size between 0.25 and 0.4 mm.

Example 1

The performance of such pure Fischer-Tropsch catalyst was compared with the performance of said hybrid catalysts, the various samples thereof being evaluated in a fixed bed reactor at a pressure of 20 bar and a molar ratio of $H_2$/CO=2.0. A temperature of 250° C. and gas hourly space velocity, GHSV,=13.5 $L_{CO+H2}/(g_{catF-T} \cdot h)$ were adopted for cases with Co/$SiO_2$ Fischer-Tropsch catalyst and a temperature of 220° C. and GHSV=7.2 $L_{CO+H2}/(g_{catF-T} \cdot h)$ for cases with Ru—Co/ITQ-6 Fischer-Tropsch catalyst. Prior to reaction the catalyst was reduced with 100% hydrogen at 400° C. for 10 h.

A steel reactor was utilized having independent supply of hydrogen, carbon monoxide and argon (inert). The reactor outlet was aligned with two traps for condensation (the first thereof at 150° C. and the second at 100° C.) of heavy paraffins produced, the light compounds being injected in line into a gas chromatograph equipped with four chromatographic columns: one thereof filled with 13× molecular sieve and two with HaysepQ, all connected to a thermal conductivity detector, and a 25 m fused silica WCOT capillary column connected to a flame ionization detector. By means of said configuration it was possible to quantify simultaneously CO, $CO_2$, argon, hydrocarbons (linear paraffins, isoparaffins and olefins containing from one to twenty-two atoms of carbon) and alcohols.

During such tests 1.0 g of pure Fischer-Tropsch catalyst (base case) or 2.0 g of said hybrid catalyst were employed in a mass proportion of 50:50. During said catalytic tests in all cases there was observed formation of a small quantity of $CO_2$, being less than 1.8%, and formation of alcohols, being less than 2.4%.

As the catalysts underwent an initial stabilization period an average was taken of the conversion of CO and of the selectivity obtained over between 15 and 20 h of reaction, estimating the quantity of waxes condensed in the same period. Table 1 provides comparison of activity and selectivity between catalysts.

TABLE 1

| Catalyst | CO conversion (%) | Selectivity (%) | | | | |
|---|---|---|---|---|---|---|
| | | $C_1$ | $C_2$-$C_4$ | $C_5$-$C_{12}$ | $C_{13}$-$C_{22}$ | $C_{23}^+$ |
| Co/$SiO_2$ | 48 | 11.8 | 10.8 | 41.0 | 28.3 | 8.1 |
| Co/$SiO_2$ + Pt/USY | 45 | 12.0 | 12.3 | 39.3 | 26.8 | 9.6 |
| Co/$SiO_2$ + Pt/BEA | 47 | 8.6 | 11.4 | 41.1 | 31.3 | 7.6 |
| Ru—Co/ITQ-6 | 49 | 11.5 | 11.9 | 36.2 | 27.3 | 13.2 |
| Ru—Co/ITQ-6 + Pt/BEA | 49 | 11.3 | 10.8 | 41.3 | 24.4 | 12.2 |

It is observed that the presence of a bifunctional Pt/USY catalyst barely modifies selectivity of the relevant fractions. The presence of a bifunctional Pt/BEA catalyst slightly increases the yield of the diesel fraction ($C_{13}$-$C_{22}$). The Fischer-Tropsch catalyst utilizing zeolite ITQ-6 as support produces less naphtha and more high molecular weight compounds.

The results shown in this example make it clear that the fact of addition of a bifunctional catalyst to a Fischer-Tropsch catalyst has little effect on both activity and hydrocarbon selectivity.

Example 2

Utilizing the same experimental equipment described in Example 1 the performance of the base Fischer-Tropsch catalyst and of the hybrid catalyst of the present invention, Co/$SiO_2$+Pt/$WO_x$—$ZrO_2$, was evaluated. The conditions employed in this experiment were: temperature=220° C. and 250° C., pressure=20 bar, molar ratio of $H_2$/CO=2.0, and gas hourly space velocity, GHSV=6.8 $L_{CO+H2}/(g_{catF-T}.h)$. Prior to reaction the catalyst was pretreated with 100% hydrogen at 400° C. for 10 h. The results shown in Table 2 demonstrate the comparative effect of temperature on activity and selectivity between said hybrid catalyst of the present invention and said base Fischer-Tropsch catalyst; they refer to averages obtained between 15 and 20 h of reaction considering the quantity of waxes condensed in the same period.

TABLE 2

| Catalyst | Temp (° C.) | CO conversion (%) | Selectivity (%) | | | | |
|---|---|---|---|---|---|---|---|
| | | | $C_1$ | $C_2$-$C_4$ | $C_5$-$C_{12}$ | $C_{13}$-$C_{22}$ | $C_{23}^+$ |
| Co/SiO$_2$ | 220 | 30 | 8.8 | 9.8 | 33.9 | 27.0 | 19.5 |
| Co/SiO$_2$ | 250 | 76 | 10.1 | 12.3 | 39.8 | 25.1 | 12.7 |
| Co/SiO$_2$ + Pt/WO$_x$—ZrO$_2$ | 220 | 33 | 8.4 | 10.0 | 35.3 | 29.9 | 16.4 |
| Co/SiO$_2$ + Pt/WO$_x$—ZrO$_2$ | 250 | 79 | 11.0 | 10.9 | 39.5 | 31.3 | 7.3 |

The results obtained demonstrate that temperature of reaction significantly influences the conversion of CO and distribution of products. Comparatively, for a given temperature, addition of a catalyst of the Pt/WO$_x$—ZrO$_2$ type has little effect on activity and yields.

Example 3

This example had the objective of evaluating the effect of the hybrid catalysts of this invention on the degree of branching of compounds corresponding to diesel ($C_{13}$-$C_{22}$). The degree of isomerisation (%) of hydrocarbons in the diesel band for different catalysts is shown in Table 3. The results shown correspond to experiments wherein the catalyst was previously reduced at a temperature of 400° C. with a stream of pure hydrogen for 10 h. Such tests were realized at 20 bar having an H$_2$/CO ratio=2, adopting a temperature of 240° C. and GHSV=10.8 $L_{CO+H2}/(g_{cat}.h)$ in cases with Co/SiO$_2$ and Co/SiO$_2$+Pt/WO$_x$—ZrO$_2$ catalysts and a temperature of 220° C. and GHSV=7.2 $L_{CO+H2}/(g_{cat}.h)$ in cases with Ru—Co/ITQ-6 and Ru—Co/ITQ-6+Pt/BEA catalysts.

TABLE 3

| N° of carbons in chain | Co/SiO$_2$ | Co/SiO$_2$ + Pt/WO$_x$—ZrO$_2$ | Ru—Co/ITQ-6 | Ru—Co/ITQ-6 + Pt/BEA |
|---|---|---|---|---|
| 13 | 5.5 | 10.0 | 1.4 | 35.2 |
| 14 | 6.1 | 9.2 | 1.2 | 33.7 |
| 15 | 6.5 | 9.2 | 1.2 | 27.9 |
| 16 | 6.7 | 6.4 | 1.5 | 26.6 |
| 17 | 6.5 | 6.2 | 1.4 | 22.5 |
| 18 | 4.2 | 7.5 | 1.5 | 18.3 |
| 19 | 3.6 | 6.6 | 1.5 | 9.5 |
| 20 | 2.9 | 6.8 | 1.7 | 8.0 |
| 21 | 2.1 | 8.4 | 1.6 | 8.4 |
| 22 | 1.0 | 9.6 | 1.8 | 8.2 |

It is clear that employing a Fischer-Tropsch catalyst based on cobalt mixed with a bifunctional catalyst, forming in this manner said hybrid catalyst of the present invention, the compounds obtained in the diesel band have a much higher degree of branching than in the base case (FT catalyst).

All references herein mentioned are inserted in their entirety and whilst the present invention has been described in its preferred methods of embodiment and representative examples the principal concept guiding the present invention, being that of a process for production of hybrid catalysts, hybrid catalyst produced according to the process mentioned and the application thereof in Fischer-Tropsch synthesis reactions for the production of hydrocarbons, is preserved as regards the innovative conceptual nature thereof. Such hybrid catalyst of the present invention reduces the requirement for a subsequent stage of hydroprocessing in FT synthesis whilst minimizing or even eliminating problems associated with transport of waxes. Those normally versed in the art will be able to perceive and practice variations, modifications, alterations, adaptations and equivalents appropriate to and compatible with the sphere of work in question without however departing from the extent of the spirit and scope of the present invention, represented by the annexed claims.

The invention claimed is:

1. A hybrid catalyst for a Fischer-Tropsch synthesis reaction comprising:
   a) 20% to 95% by weight of a Fischer-Tropsch catalyst based on Co, carried on a support selected from the group consisting of silica, alumina, titania, niobia, zeolites and mesoporous silicoaluminates;
   b) 5% to 80% by weight of a bifunctional catalyst containing at least one metal from Group IVB associated with or optionally replaced by a metal from Group VIII carried on a support selected from the group consisting of zeolites, mesoporous silicoaluminates, and mixed acid oxides of the type WO$_x$—ZrO$_2$.

2. A hybrid catalyst according to claim 1, wherein said Fischer-Tropsch catalyst referred to in (a) contains between 5% and 40% by weight of Co carried on a support selected from the group consisting of silica, alumina, titania, niobia, zeolites and mesoporous silicoaluminates.

3. A hybrid catalyst according to claim 2, wherein said Fischer-Tropsch catalyst is promoted by a metal selected from the group consisting of Ru, Re, Pd, Pt, Zr, Ti, Cr, Zn, Al, Mg, Mn, Cu and Ag.

4. A hybrid catalyst according to claim 1, wherein said bifunctional catalyst in (b) contains between 0.1% and 50% by weight, of at least one metal from group IVB associated with or replaced by a metal selected from the group consisting of Group VIII carried zeolites, mesoporous silicoaluminates, and mixed acid oxides of the type WO$_x$—ZrO$_2$.

5. A hybrid catalyst according to claim 1 wherein said zeolites or mesoporous silicoaluminates in (a) and (b) are selected from the group consisting of MOR, FAU, BEA, ITQ-2, and ITQ-6.

6. A hybrid catalyst according to claim 1, wherein:
   a) 40% to 90% by weight of a Fischer-Tropsch catalyst based on Co, carried on a support selected from the group consisting of silica, alumina, titania, niobia, zeolites and mesoporous silicoaluminates;
   b) 10% to 60% by weight of a bifunctional catalyst containing at least one metal from Group IVB associated with or optionally replaced by a metal from Group VIII carried on a support selected from the group consisting of zeolites, mesoporous silicoaluminates, and mixed acid oxides of the type W0$_x$—ZrO$_2$.

7. A hybrid catalyst according to claim 1, wherein said Fischer-Tropsch catalyst in (a) contains between 10% and 30% by weight, of Co carried on a support selected from the group consisting of silica, alumina, titania, niobia, zeolites and mesoporous silicoaluminates.

8. A hybrid catalyst according to claim 1, wherein said bifunctional catalyst in (b) contains between 0.2% and 40% by weight, of at least one metal from group IVB associated with or replaced by a metal from Group VIII carried zeolites, mesoporous silicoaluminates, or mixed acid oxides of the type WO$_x$—ZrO$_2$.

* * * * *